United States Patent
Kamiya et al.

(10) Patent No.: US 12,536,384 B1
(45) Date of Patent: Jan. 27, 2026

(54) INFORMATION PROCESSING SYSTEM FOR GENERATING RESPONSE DATA FOR A CHARACTER, METHOD AND PROGRAM

(71) Applicant: I'mbesideyou Inc., Tokyo (JP)

(72) Inventors: Shozo Kamiya, Tokyo (JP); Kotaro Ando, Tokyo (JP)

(73) Assignee: I'MBESIDEYOU INC., Tokyo (JP)

( * ) Notice: Subject to any disclaimer, the term of this patent is extended or adjusted under 35 U.S.C. 154(b) by 0 days.

(21) Appl. No.: 19/112,596

(22) PCT Filed: Jul. 26, 2024

(86) PCT No.: PCT/JP2024/026888
§ 371 (c)(1),
(2) Date: Mar. 18, 2025

(51) Int. Cl.
*G06F 40/35* (2020.01)
*G06F 16/483* (2019.01)

(52) U.S. Cl.
CPC .......... *G06F 40/35* (2020.01); *G06F 16/483* (2019.01)

(58) Field of Classification Search
CPC ............................... G06F 16/483; G06F 40/35
See application file for complete search history.

(56) References Cited

U.S. PATENT DOCUMENTS

2014/0278429 A1* 9/2014 Ganong, III .......... G06F 16/685
704/260
2019/0129957 A1* 5/2019 Raikar ............... H04N 21/8456

FOREIGN PATENT DOCUMENTS

| JP | 2019-091387 A | 6/2019 |
| JP | 6719747 B2 | 7/2020 |
| JP | 2022-146699 A | 10/2022 |
| WO | 2022201955 A1 | 9/2022 |

OTHER PUBLICATIONS

@akasaki1211, "I will allow one or so humans to participate in the conversation between AI characters with your permission.", Web, Apr. 20, 2023, URL:https://web.archive.org/web/20230419210059/ https://quiita.com/akasaki1211/items/fe5182da2cf88dc87ee5, 29pp.
Cheng Li et al., "ChatHaruhi: Reviving Anime Character in Reality via Large Language Model", Web, Aug. 18, 2023, URL:https:// arxiv.org/abs/2308.09597, 13pp.
International Search Report in PCT/JP2024/026888, mailed Sep. 24, 2024, 4pp.
Notice PCT/ISA/220 in PCT/JP2024/026888, mailed Sep. 24, 2024, 2pp.
Written Opinion in PCT/JP2024/026888, mailed Sep. 24, 2024, 4pp.

* cited by examiner

*Primary Examiner* — Eric Yen
(74) *Attorney, Agent, or Firm* — HAUPTMAN HAM, LLP

(57) ABSTRACT

An information processing system characterized by comprising: a response data generation unit that generates response data with which a character responds in response to conversation data from a user to the character, wherein the response data generation unit generates the response data so as to quote lines included in an original work in which the character appears; and an output unit that outputs the response data to the user.

6 Claims, 4 Drawing Sheets

INFORMATION PROCESSING SYSTEM FOR GENERATING RESPONSE DATA FOR A CHARACTER, METHOD AND PROGRAM

RELATED APPLICATIONS

The present application is a National Phase of International Application No. PCT/JP2024/026888 filed Jul. 26, 2024.

TECHNICAL FIELD

This invention relates to information processing systems, information processing methods and programs.

BACKGROUND ART

Dialogue between a user and a computer is taking place (see Patent Document 1).

CITATION LIST

Patent Literature

[PTL1] U.S. Pat. No. 6,719,747

SUMMARY OF INVENTION

Technical Problem

Scenario-based dialogues may not maintain the user's interest.

The purpose of this invention is to provide a technology that can provide conversational content of interest to the user.

Solution to Problem

The principal invention to solve the above problem comprises: a response data generation unit that generates response data with which a character responds in response to conversation data from a user to the character, wherein the response data generation unit generates the response data so as to quote lines included in an original work in which the character appears; and an output unit that outputs the response data to the user.

Other issues disclosed in this application and their solutions will be clarified in the Embodiments of the Invention section and the drawings.

Advantageous Effects of Invention

According to the present invention, it is possible to emit conversational content that is of interest to the user.

DESCRIPTION OF EMBODIMENTS

<System Overview>

The following is a description of the information processing system of one embodiment of the invention. The information processing system in this embodiment attempts to conduct a conversation between the user and the system. Characters appearing in a specific work (e.g., manga, anime, film, novel, game, etc.) engage in conversation, and during the conversation, they quote lines included in the work (which may be the lines of the character in question or may be the lines of other characters).

Although this embodiment will be described using mainly text-based conversations as an example, the invention is not limited to this. For example, the following various forms of conversation are also included in the scope of the invention.

(1) Conversation using voice: The system accepts voice input from the user and outputs responses in the voice of a character using voice synthesis technology.

(2) Conversation including images: Images and emoji sent by the user are analyzed and responses are generated accordingly. The response can also include images showing the character's facial expressions and posture.

(3) Conversation using video: Combine with character animation or live-action video to create a more realistic conversation.

(4) Conversations using augmented reality (AR) and virtual reality (VR): Provide a more immersive conversational environment by projecting characters in real or virtual space.

(5) Multi-modal conversation: Enables richer expressions by combining multiple formats such as text, voice, images, and video.

These various formats can be used independently or in combination. In the following description, we will mainly use text-based conversation as an example, but it goes without saying that the techniques of the invention can be applied to the other formats mentioned above.

Figure 1:
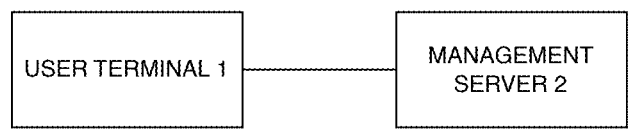
FIG. 1 shows an example of the overall configuration of an information processing system.

FIG. 1 shows an example of the overall configuration of an information processing system. The information processing system in this embodiment is configured to include a management server 2. The management server 2 is communicatively connected to the user terminal 1 via a communication network. The communication network is, for example, the Internet, and is constructed using a public telephone network, cellular telephone network, wireless communication channel, Ethernet (registered trademark), etc.

The user terminal 1 is a computer operated by a user. User terminal 1 can be, for example, a smartphone, tablet computer, or personal computer.

The management server 2 can be a general-purpose computer, such as a workstation or personal computer, or it can be logically realized by cloud computing.

<Management Server>

Figure 2:
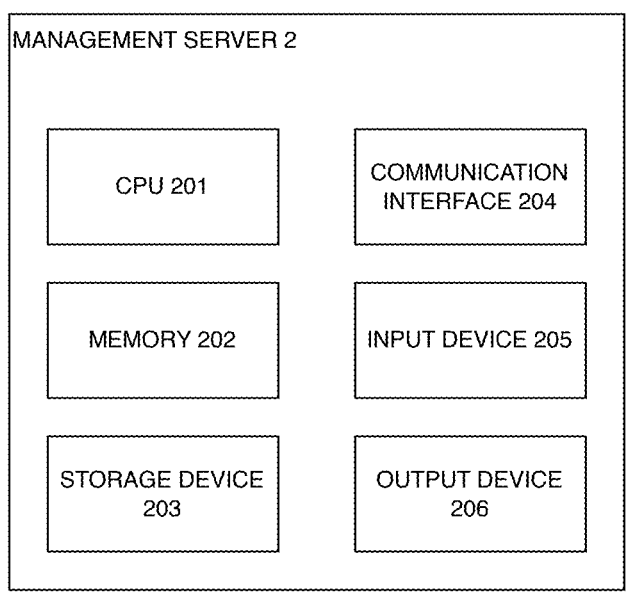
FIG. 2 shows an example of the hardware configuration of the management server 2.

FIG. 2 shows an example of the hardware configuration of the management server 2. The configuration shown in the figure is an example and may have other configurations. Management server 2 is equipped with CPU 201, memory 202, storage device 203, communication interface 204, input device 205, and output device 206. The storage device 203 is, for example, a hard disk drive, solid state drive, or flash memory that stores various data and programs. The communication interface 204 is an interface for connecting to a communication network, such as an adapter for connecting to Ethernet (registered trademark), a modem for connecting to a public telephone network, a wireless communicator for wireless communication, or USB (Universal Serial Bus) connectors and RS232C connectors for serial communication. Input device 205 is, for example, a keyboard, mouse, touch panel, buttons, microphone, etc., for inputting data. Output device 206 outputs data, for example, through a display, printer, speaker, etc. Each functional part of the management server 2 described below is realized by CPU 201 reading a program stored in storage device 203 into memory 202 and executing it, and each storage part of the management server 2 is realized as part of the memory space provided by memory 202 and storage device 203.

Figure 3:
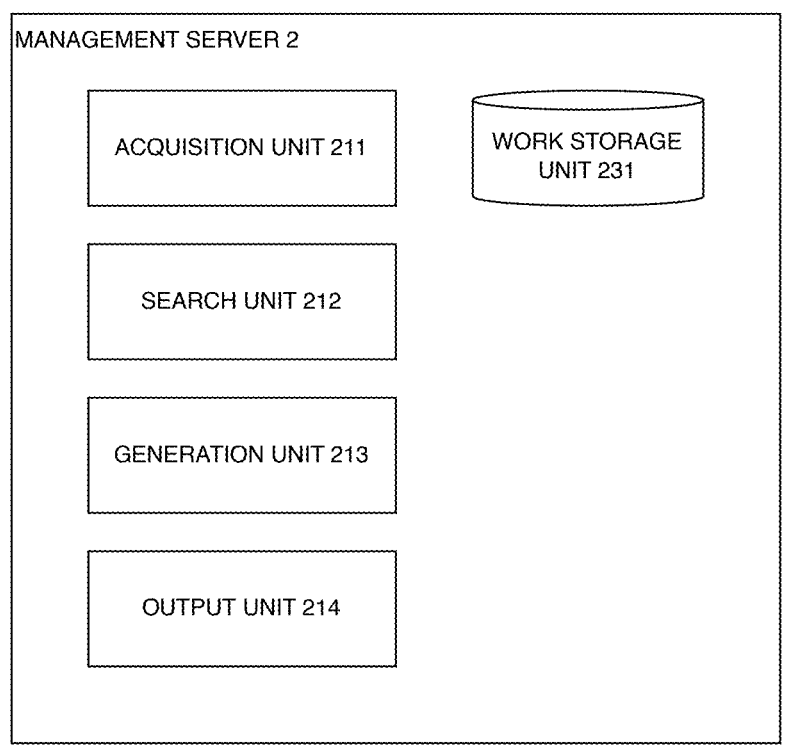
FIG. 3 shows an example of the software configuration of the management server 2.

FIG. 3 shows an example of the software configuration of the management server 2. The management server 2 is equipped with a work storage unit 231, an acquisition unit 211, a search unit 212, a generation unit 213, and an output unit 214.

The work storage unit 231 stores lines contained in various forms of works. The works here are not limited to manga, but include novels, animations, movies, TV dramas, stage performances, games, poems, lyrics, and any other creative works in which characters appear, and lines or dialogues exist. The work storage unit 231 can store scenes of the work and the lines included in the scenes. In this embodiment, it is assumed that a scene of a work is image data for displaying a page of manga, and a line is text data. The scenes may be image data for displaying panels of manga.

The information stored in the work storage unit 231 can be structured according to the format of the work as follows.
  (1) In the case of manga
    Lines: text data
    Scene: Image data for displaying a page or panel
    Context information: information on the chapter or volume in which the lines appear
  (2) For novels
    Lines: text data
    Context: narrative text before and after the lines
    Scene: A cohesive passage that includes the lines and narrative text
    Metadata: chapter, page number, etc.
  (3) For animation and movies
    Lines: text data (subtitles and scripts)
    Sound data: sound files of lines
    Scene: a still image or short video clip of the scene in question
    Time stamp: Time when the lines appear in the work
  (4) For games
    Lines: text data
    Scene: Description of the situation or event in the game in which the lines appear, or a captured video
    Character state: State of the character at the time the line is uttered (e.g., health, emotions, etc.)
  (5) For stage and theater:
    Lines: text data
    Scene: Description of the scene in which the lines appear, captured video
    Stage directions: Performance instructions accompanying the lines
    Act/scene information: Information about the act or scene in which the lines appear The work storage unit 231 can store vector data with embedded lines associated with the lines. This embedding process is applicable regardless of the format of the work and enables efficient retrieval of lines and similarity calculation.

The work storage unit 231 can also store additional information about the work and characters. For example, the work storage unit 231 can store the genre of the work, year of production, author information, character characteristics, personality, background settings, important events and turning points in the work, and information about the world view and setting of the work. This additional information can be used to select more contextually appropriate lines and to generate responses that reflect the character's characteristics.

The acquisition unit 211 acquires conversation data for the character from the user. In this embodiment, the conversation data is text data input by the user at the user terminal 1. The acquisition unit 211 can receive the conversation data from the user terminal 1.

The search unit 212 retrieves lines related to the acquired conversation data. The search unit 212 can retrieve lines related to the conversation data from the work storage unit 231. The following multiple methods can be employed to search for lines.
  (1) Cosine similarity: Calculate the cosine distance between the vector data of the embedded conversation data and the vector data stored in the work storage unit 231, and judge lines with a close distance to be highly related.
  (2) Euclidean distance: Calculate the linear distance on the vector space and select lines that are close in distance.
  (3) Manhattan distance: Calculate the sum of the absolute values of the differences in each dimension of the vectors and select lines that are close in distance.
  (4) Jaccard similarity: Treats the conversation data and lines as a set of words and calculates the percentage of words in common to determine the degree of similarity.
  (5) Edit distance (Levenshtein distance): The minimum number of string editing operations between the conversation data and the lines is calculated, and the lines with the closest distance are selected.
  (6) Latent Semantic Analysis (LSA): Calculates the degree of similarity by considering the latent semantic relationship between the conversation data and the lines.
  (7) BM25 algorithm: A ranking algorithm widely used in information retrieval is applied to select highly relevant lines.

The search unit 212 can use these methods alone or a combination of multiple methods. It can also dynamically select an appropriate method depending on the context of the conversation and the required accuracy.

The generation unit 213 generates text that responds to the conversation data (hereinafter referred to as "response data"). The generation unit 213 can generate response data so as to quote lines included in the original work in which the character appears. Note that the generation unit 213 does not use the lines themselves as response data but generates response data so that the lines are included as quotations along with the main text. The following multiple methods can be employed to generate response data.
  (1) Large-scale language model (LLM): Using LLMs such as GPT-3, GPT-4, PaLM, and LLAMA to generate responses by inputting prompts that include the conversation data and lines.
  (2) Rule-based system: Generates responses by combining conversation data and lines based on predefined response patterns and rules.
  (3) Search-based system: Searches a large dialogue corpus for dialogue examples similar to the conversation data, and generates new responses based on those responses.
  (4) Template-based generation: Generates responses by embedding conversation data and line information into pre-prepared templates.

(5) Machine translation approach: Converts conversation data into intermediate representations, which are then "translated" to match the character's tone and settings to generate responses.

(6) Reinforcement learning model: Generates responses using a reinforcement learning model with defined reward functions, trained to maximize character authenticity and conversation naturalness.

(7) Neural Dialogue Models: Generates responses using neural network models specialized for dialogue, such as Sequence-to-Sequence models and models with attention mechanisms.

The generation unit 213 can use these methods alone or a combination of multiple methods. For example, a combination can be used, such as using a rule-based system to generate the basic response structure and then using LLM to refine the response. It is also possible to dynamically select an appropriate method based on character characteristics and the complexity of the conversation.

The generation unit 213 can generate response data so as to quote lines when lines related to the conversation data are retrieved by the search unit 212 and can generate response data as a response to the conversation data without quoting lines when lines are not retrieved. When quoting lines, the generation unit 213 selects an appropriate quotation method and incorporates the lines into the response data in a natural way. Even when lines are not quoted, appropriate responses are generated considering character characteristics and the context of the conversation.

In this embodiment, the generation unit 213 can provide the large-scale language model with a prompt that includes conversation data and instructions for creating a response to said conversation data, and have the model generate response data that does not quote lines. For example, the generation unit 213 can provide the large-scale language model with a prompt that includes the conversation data, the retrieved lines, and instructions for creating a response to the conversation data so as to quote said lines, thereby causing the model to generate response data that quotes the lines.

The generation unit 213 can employ the following methods for quoting the lines. (1) Direct quotation: The retrieved lines are inserted directly into the response data. (2) Partial quotation: A portion of the retrieved lines are excerpted and inserted into the response data. (3) Paraphrasing: The meaning of the retrieved lines is retained, but a different expression is incorporated into the response data. (4) Free translation: Captures the essential meaning and emotion of the retrieved lines and incorporates them into the response data by changing the expressions to fit the current conversation context. The generation unit 213 can appropriately select these quotation methods based on the flow of the conversation, the length of the retrieved lines, and user preferences. In this embodiment, direct quotation is assumed as the method of quoting lines.

The generation unit 213 can use the following criteria for selecting lines to be quoted: (1) Relevance: Select lines for which the semantic similarity between the conversation data and the lines exceeds a predetermined threshold. (2) Emotional agreement: Preferentially select lines that match the user's emotional state estimated from the conversation data and the emotional expression of the lines. (3) Character agreement: Preferentially select lines uttered by the character in the conversation. (4) Importance: Preference is given to lines that have a high degree of importance or memorability in the original work. (5) Variety: To avoid excessive repetition of the same lines, preferentially select lines that have not been used in previous conversations. By using a combination of these criteria, the generation unit 213 can select more appropriate lines.

In order to incorporate the selected lines naturally into the response data, the generation unit 213 can perform the following processes: (1) Introduction generation: Before quoting a line, generate appropriate introductory text (e.g., "Come to think of it, there was this line . . . "). (2) Follow-up explanation: After quoting a line, generate sentences that explain the intent and relevance of the quotation. (3) Context adjustment: Generate sentences before and after the selected lines that match the flow of the conversation to incorporate the lines naturally. (4) Character consistency: Generate sentences that reflect the character's speech patterns and personality in the response data outside of the quoted portion. Through these processes, the generation unit 213 can generate response data that is more natural and without discomfort.

The large-scale language model (LLM) used by the generation unit 213 can be, for example, GPT-3, GPT-4, PaLM, LLAMA, or models with equivalent performance. The following procedures can be adopted as methods for using LLMs.

(1) Initialization of LLM: Load the LLM to be used and perform fine-tuning if necessary. In fine-tuning, the model is trained using relevant datasets to reflect the character's characteristics and the worldview of the work. Note that in this embodiment, it is assumed that pre-trained LLMs are used as is.

(2) Context setting: Create system prompts including background information of the conversation and character settings and provide them to the LLM.

(3) Conversation history management: Maintain conversation history with the user and input it to the LLM at each turn.

(4) Prompt generation: Dynamically generate prompts containing conversation data, retrieved lines, and instructions for response generation.

(5) Input to LLM: Input the generated prompts to the LLM to obtain responses. Note that the LLM may be provided by the management server 2, or the response may be obtained by calling the API of an external server that performs the generation process using the LLM.

(6) Post-processing: Adjust the output of the LLM as necessary to create the final response data.

Examples of prompts include the following.

Example 1: When Quoting Lines

System: You act as [character name]. [brief description of character]. Please quote the given lines naturally in the conversation.
User: [user's conversation data]
Related lines: "[Lines in the work]"
Instructions: Please respond to the user's conversation data as [character name], quoting the above lines naturally.

Example 2: If No Lines are Found

System: You act as [character name]. [brief description of character].
User: [user's conversation data]
Instructions: Please respond to the user's conversation data as [character name]. Do not quote lines from the work but generate your own response that reflects the character's personality and tone.

The generation unit 213 can use these prompts as templates and change the content dynamically according to the actual conversation situation. For example, character names, character descriptions, user conversation data, and related lines are replaced with appropriate values each time they are input to the LLM. It is also possible to flexibly change the structure of the prompts and the content of the instructions according to the flow of the conversation and the characteristics of the retrieved lines.

The generation unit 213 may include some of the lines in the prompts to enable learning through few-shot learning.

The output unit 214 outputs the generated response data to the user. The output unit 214 transmits the response data to the user terminal 1, and the user terminal 1 can display the response data. The output unit 214 can output to the user a scene corresponding to the retrieved lines stored in the work storage unit 231. After outputting the response data, the output unit 214 can output the scene in response to a request from the user.

<Operation>

Figure 4:
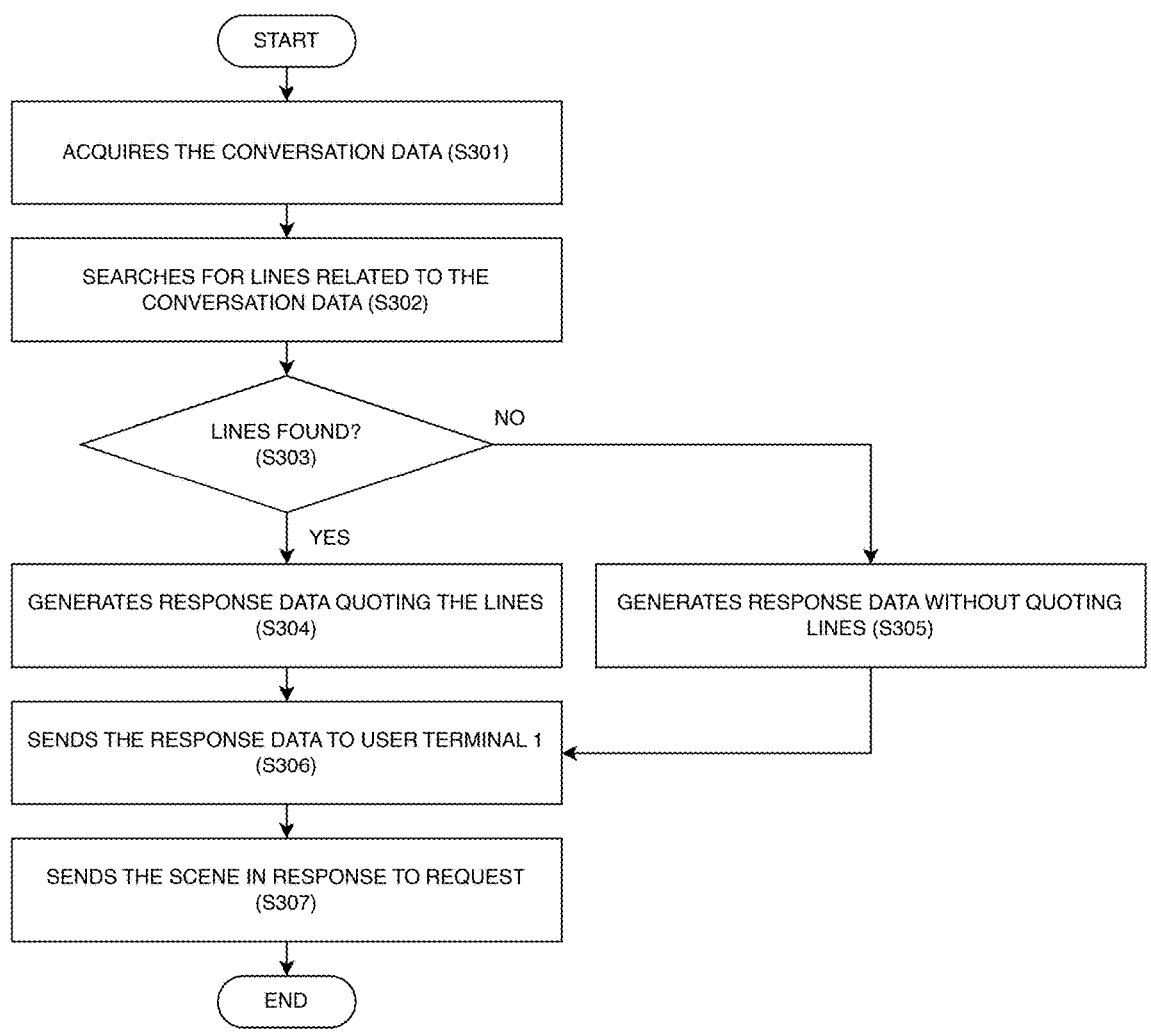
FIG. 4 illustrates the operation of the management server 2.

FIG. 4 illustrates the operation of the management server 2.

The management server 2 acquires the conversation data (S301), searches for lines related to the conversation data (S302), if the lines can be found (S303: YES), generates response data quoting the lines (S304), if the lines cannot be found (S303: NO), generates response data without quoting lines (S305), and sends the response data to user terminal 1 (S306). The management server 2 can read the scene corresponding to the lines from the work storage unit 231 and send it to the user terminal 1 in response to a request from the user terminal 1 (S307).

As described above, according to the information processing system of this embodiment, in a conversation between a user and the system, the system can respond by quoting lines from works that are related to the conversation data received from the user.

The above description of this embodiment is intended to facilitate understanding of the invention and is not intended to limit the interpretation of the invention. The invention may be changed and improved without departing from its spirit, and the invention also includes equivalents thereof.

For example, the processing by each functional unit of the management server 2 described above may be performed by any of the functional units. Also, different functional units that execute parts of the processing of each functional unit described above may be added. The functional units of the management server 2 may also be distributed across multiple computers.

The information stored by each storage unit of the management server may be stored by any of the storage units. In other words, a single storage unit may store the information that was described as being stored across multiple storage units above, or a portion of the information stored in one storage unit may be stored in another storage unit.

Variation 1

In addition to the configuration of the above embodiment, Variation 1 has a function corresponding to multimodal input. The following explanation focuses on the points that differ from the above embodiment.

In addition to the configuration of the above embodiment, the management server 2 in Variation 1 can be equipped with a speech recognition unit and an image recognition unit.

The speech recognition unit analyzes speech data input from the user and converts it into text data. The speech recognition unit uses a speech recognition model based on deep learning, for example, to perform highly accurate conversion from speech to text. Prosodic information such as voice inflection and tone is also extracted and can be used to estimate the user's emotional state.

The image recognition unit analyzes image data input from the user and recognizes objects, facial expressions, situations, etc. in the image. The image recognition unit uses a convolutional neural network (CNN) or other deep learning model to extract image features. The recognition results are output as text data.

The acquisition unit 211 can accept not only text data, but also speech data and image data as input. When speech data is input, the acquisition unit 211 converts it to text using the speech recognition unit. When image data is input, the acquisition unit 211 converts the image content into text using the image recognition unit.

The search unit 212 searches for relevant lines based on the contents of the speech data and image data converted into text. For example, if a user sends an image with a sad expression, the search unit 212 can preferentially search for sad scenes and comforting lines in the work.

The generation unit 213 generates response data considering the characteristics of multimodal input. For example, it can estimate the emotion from the user's speech input and quote lines in a tone that matches that emotion, or it can prioritize the use of lines related to the content of the image sent by the user.

The output unit 214 can not only output the generated response data as text but can also read out the response in a character's voice using speech synthesis technology, or simultaneously display images or video related to the response.

Variation 2

In Variation 2, in addition to the configuration of the above embodiment, it has the function to converse with multiple characters simultaneously. The following explanation focuses on the points that differ from the above embodiment.

In addition to the configuration of the above embodiment, the management server 2 in Variation 2 can be equipped with a character management unit and a dialogue control unit.

The character management unit manages information on multiple characters participating in a conversation. It maintains information on each character's settings, personality, relationships with other characters, etc., and has the ability to select the appropriate character according to the context of the conversation.

The dialogue control unit controls the flow of dialogue between multiple characters. It determines which character will respond to the user's statements and what kind of interactions will take place between the characters. It also manages the dialogue history between characters in order to maintain the naturalness and consistency of the conversation.

In addition to the configuration of the above embodiment, the work storage unit 231 also stores scenes of interactions between characters and group conversations. This makes it possible to quote appropriate lines and dialogue patterns for situations involving multiple characters.

When searching for lines related to the user's conversation data, the search unit 212 targets not only the lines of a single character but also dialogue scenes involving multiple characters.

The generation unit 213 has the function of generating responses of multiple characters simultaneously. Response data is generated to reproduce natural interactions, taking into account the characteristics and relationships of each character. In addition, the following factors are considered when generating dialogue between characters:
(1) Relationships among characters (friendly, confrontational, hierarchical, etc.)
(2) Characteristics of each character's personality and speaking style
(3) Conversation context and situation
(4) Contents and intentions of the user's statements
(5) Past dialogue history The output unit 214 presents the generated multiple character responses to the user in a format that allows each character to be distinguished. For example, in the case of text chat, each character's remarks can be displayed in a different color or speech bubble, or with a character icon.

Although Variation 2 describes a format in which the user directly converses with multiple characters, it is also possible to use a role-playing format of dialogue in which the user manipulates a particular character and converses with other characters as that character. In this case, the generation unit 213 can be provided with a function to suggest appropriate response candidates, taking into account the characteristics of the character operated by the user.

Variation 3

In Variation 3, in addition to the configuration of the above embodiment, it has the function to generate more appropriate line quotations and responses by considering the past conversation history. The following explanation focuses on the points that differ from the above embodiment. In addition to the configuration of the above embodiment, the management server 2 of Variation 3 has a conversation history storage unit and a context analysis unit.

The conversation history storage unit stores the past conversation history between the user and the system. It stores the user's statements, system responses, quoted lines, and time information of the conversation in each conversation session. It also records important information (e.g., user preferences and experiences) mentioned during the conversation.

The context analysis unit has the function of analyzing the current conversation data and past conversation history to understand the context of the conversation. Specifically, the following processes are performed:
(1) Tracking of topic transition
(2) Estimation of the user's emotional state
(3) Understanding the long-term purpose and direction of the conversation
(4) Analyzing relationships between users and characters
(5) Recording of previously quoted lines and avoidance of duplication The search unit 212 uses the information obtained from the context analysis unit to search for more contextually appropriate lines. For example, the following search criteria can be added:
(1) Priority for lines related to the current topic
(2) Priority for lines that have not been quoted in the past
(3) Selection of lines that are compatible with the user's current emotional state
(4) Selection of lines that are consistent with the long-term objectives of the conversation The generation unit 213 generates more appropriate responses by considering the information obtained from the context analysis unit. Specifically, it realizes the following functions:
(1) Appropriate reference to information mentioned in previous conversations
(2) Maintenance of conversational consistency (avoidance of contradictory statements)
(3) Development of topics based on user interests and responses
(4) Structuring the conversation over time (introduction, development, conclusion, etc.)
(5) Adjustment of response style according to the development of the relationship with the user As described above, Variation 3 makes it possible to generate more appropriate line quotations and responses by considering past conversation history. This enables more natural and contextualized dialogues that are consistent over the long term.

Note that in Variation 3, it is important to consider user privacy by appropriately setting the retention period and scope of use of the conversation history. For example, a function can be implemented to store the conversation history with the user's consent and automatically delete it after a certain period of time. It is also conceivable to clearly explain the purpose of using the conversation history and provide a mechanism by which the user can request deletion or suspension of use of the history.

Also, the functions of this embodiment can be implemented in combination with Variation 1 and Variation 2. For example, by considering the history of multimodal input or by tracking the development of the relationship with each character in a conversation with multiple characters, a more advanced dialogue experience can be provided.

Variation 4

In addition to the configuration of the above embodiment, Variation 4 has a function that learns the user's preferences and interests and selects lines and generates responses accordingly. The following explanation focuses on the points that differ from the above embodiment.

In addition to the configuration of the above embodiment, the management server 2 of Variation 4 has a user profile storage unit, a preference learning unit, and a preference consideration unit.

The user profile storage unit stores the preference information of each user. Specifically, the following information can be stored:
(1) Preferred characters
(2) Genres and topics of interest
(3) Frequently quoted lines and their characteristics
(4) Conversation patterns that user responded well to
(5) Frequency and time of use by the user
(6) Basic attribute information of the user (age group, gender, etc., collected with the user's consent)

The preference learning unit has the function of learning user preferences from the conversation data with the user and the user's behavior. Specifically, the following processes can be performed:
(1) Analysis of the content of the user's statements
(2) Tracking of user responses (e.g., use of the "Like" button, duration of conversation)
(3) Extraction of topics frequently mentioned by users
(4) Analysis of the language and expression style preferred by users (5) Measuring the degree of interest users show in specific characters and works The preference learning unit periodically updates the information in the user profile storage unit based on the results of these analyses.

The preference consideration unit has a function to refer to the preference information stored in the user profile storage unit and reflect it in the selection of lines and generation of responses.

The search unit 212 uses the information obtained from the preference consideration unit to preferentially search for lines that match the user's preferences. For example, the following search criteria can be added:
  (1) Priority for lines of the user's favorite character
  (2) Selection of lines related to the user's genre or topic of interest
  (3) Selection of lines that are similar to the characteristics of lines to which the user has responded favorably in the past The generation unit 213 generates responses tailored to the user's preferences by considering the information obtained from the preference consideration unit. Specifically, the following functions are realized:
  (1) Adoption of the user's preferred wording and expression style
  (2) Directing topics of conversation to topics of user interest
  (3) Selection of characters that match user preferences (when multiple characters are supported)
  (4) Reproduction of conversation patterns that received favorable responses from users As described above, according to Variation 4, it is possible to learn the user's preferences and interests and select lines and generate responses accordingly. This makes it possible to provide a more engaging and personalized dialogue experience for the user.

Note that in Variation 4, sufficient care must be taken in handling user preference information. For example, the following measures should be taken:
  (1) Collect and use preference information with the explicit consent of the user
  (2) Clearly explain the scope of information to be collected and the purpose of use
  (3) Provide a function that allows users to check, modify, and delete their own preference information
  (4) Implement appropriate security measures such as encryption and access control of preference information Also, the functions of this embodiment can be implemented in combination with the other embodiments described above. For example, by combining with Variation 3, a more advanced dialogue system can be realized that takes into account both past conversation history and user preferences.

Variation 5

In addition to the configuration of the above embodiment, Variation 5 has a function to incorporate new works and added lines in real time and reflect the latest information. The following explanation focuses on the points that differ from the above embodiment.

The management server 2 in Variation 5 has, in addition to the configuration of the above embodiment, an update monitoring unit, a data acquisition unit, and an integration processing unit.

The update monitoring unit has the function of periodically checking for new work information and additional lines. Specifically, the following processes are performed:
  (1) Periodic access to external data sources (publishers' APIs, official websites, etc.)
  (2) Receiving update notifications using RSS feeds, Webhooks, etc.
  (3) Monitoring of the update date and time of the works database The data acquisition unit has the function of acquiring new information detected by the update monitoring unit. Specifically, it performs the following processes:
  (1) Acquisition of metadata (title, author, release date, etc.) of new works
  (2) Downloading new line data
  (3) Acquisition of updated work information The integration processing unit has the function of integrating the new information acquired by the data acquisition unit with existing data. Specifically, the following processing is performed:
  (1) Addition of new work data to the work storage unit 231
  (2) Adding or updating lines to existing works
  (3) Format conversion of new data (e.g., from text data to embedded vectors)
  (4) Checking data consistency and error processing The work storage unit 231 is always kept up-to-date by the integration processing unit. This allows the search unit 212 and the generation unit 213 to always use the latest work information and lines.

As described above, according to Variation 5, it is possible to incorporate new works and added lines in real time, and to always conduct dialogue that reflects the latest information.

Note that in Variation 5, the frequency of data updates and timing of acquisition must be set appropriately. In order to avoid excessive system load due to the update process, adjustments such as modifying the update frequency or executing the update process during times when the system load is low can be considered.

Quality control of newly added data is also important. Implementing validity checks of new data and filtering functions for inappropriate content in the integration processing unit can ensure system reliability and safety.

The functions of Variation 5 can also be implemented in combination with the other variations mentioned above. For example, by combining with Variation 4, a more attractive dialogue experience can be realized, such as by prioritizing the latest lines or work information that matches the user's preferences.

Disclosure

This disclosure also includes the following configurations.

Item 1

An information processing system comprising:
  a response data generation unit that generates response data with which a character responds in response to conversation data from a user to the character,
  wherein the response data generation unit generates the response data so as to quote lines included in an original work in which the character appears; and
  an output unit that outputs the response data to the user.

Item 2

The information processing system according to item 1, comprising:
- a work storage unit that stores the lines included in the original work; and
- a search unit that retrieves the lines related to the conversation data from the work storage unit,
- wherein the response data generation unit generates the response data by providing a large-scale language model with a prompt that includes the conversation data, the retrieved lines, and an instruction to create a response to the conversation data so as to quote the lines.

Item 3

The information processing system according to item 1, comprising:
- a work storage unit that stores scenes of the original work and lines included in the scenes; and
- a search unit that retrieves the lines related to the conversation data from the work storage unit,
- wherein the output unit retrieves the scene corresponding to the lines from the work storage unit, and outputs the retrieved scene to the user.

Item 4

The information processing system according to item 1, comprising:
- a search unit that retrieves the lines related to the conversation data,
- wherein the response data generation unit generates the response data so as to quote the lines when the lines are retrieved, and generates the response data as a response to the conversation data without quoting the lines when the lines are not retrieved.

Item 5

The information processing system according to item 1, wherein the response data generation unit generates the response data so as to quote the lines by a second character different from a first character.

Item 6

An information processing method executed by a computer, the method comprising:
- generating response data with which a character responds in response to conversation data from a user to the character; and
- outputting the response data to the user,
- wherein generating the response data so as to quote lines included in an original work in which the character appears.

Item 7

A program for causing a computer to:
- generate response data with which a character responds in response to conversation data from a user to the character; and
- output the response data to the user,
- wherein the program causes the computer to generate the response data so as to quote lines included in an original work in which the character appears.

The invention claimed is:

1. An information processing system comprising:
   - a response data generation unit that generates response data with which a first character responds in response to conversation data from a user to the first character, wherein the response data generation unit generates the response data so as to quote lines of a second character, who is different from the first character, included in an original work in which the first character appears; and
   - an output unit that outputs the response data to the user.

2. The information processing system according to claim 1, comprising:
   - a work storage unit that stores the lines of the second character included in the original work; and
   - a retrieval unit that retrieves lines related to the conversation data from the work storage unit,
   - wherein the response data generation unit generates the response data by providing a large-scale language model with a prompt that includes the conversation data, the retrieved lines related to the conversation data, and an instruction to create a response to the conversation data so as to quote the retrieved lines related to the conversation data.

3. The information processing system according to claim 1, comprising:
   - a work storage unit that stores scenes of the original work and lines of the second character included in the scenes; and
   - a retrieval unit that retrieves lines related to the conversation data from the work storage unit,
   - wherein the output unit retrieves a scene of the stored scenes corresponding to the retrieved lines related to the conversation data from the work storage unit, and outputs the retrieved scene to the user.

4. The information processing system according to claim 1, comprising:
   - a retrieval unit that retrieves lines related to the conversation data,
   - wherein the response data generation unit generates the response data so as to quote the retrieved lines related to the conversation data, and generates the response data as a response to the conversation data without quoting the retrieved lines related to the conversation data when the lines related to the conversation data are not retrieved.

5. An information processing method executed by a computer, the method comprising:
   - generating response data with which a first character responds in response to conversation data from a user to the first character; and
   - outputting the response data to the user,
   - wherein the response data is generated so as to quote lines of a second character included in an original work in which the first character appears, the second character being different from the first character.

6. A non-transitory computer-readable storage medium storing a program that, when executed by a computer, causes the computer to:
   - generate response data with which a first character responds in response to conversation data from a user to the first character; and
   - output the response data to the user,
   - wherein the program causes the computer to generate the response data so as to quote lines of a second character included in an original work in which the first character appears, the second character being different from the first character.

* * * * *